United States Patent [19]
Satoh

[11] Patent Number: 5,819,633
[45] Date of Patent: Oct. 13, 1998

[54] REACTION MECHANISM FOR BRAKE BOOSTER

[75] Inventor: Tohru Satoh, Saitama-Ken, Japan

[73] Assignee: Jidosha Kiki Co., Ltd., Tokyo, Japan

[21] Appl. No.: 895,062

[22] Filed: Jul. 16, 1997

[30] Foreign Application Priority Data

Aug. 9, 1996 [JP] Japan ................................. 8-227898

[51] Int. Cl.⁶ ..................................................... F15B 9/10
[52] U.S. Cl. ............................................................. 91/369.2
[58] Field of Search ............................ 91/369.2, 369.3, 91/376 R

[56] References Cited

U.S. PATENT DOCUMENTS

| | | | |
|---|---|---|---|
| 3,548,595 | 12/1970 | Pech et al. ............................ | 91/369.3 |
| 4,545,206 | 10/1985 | Kobayashi . | |
| 4,664,016 | 5/1987 | Tobisawa et al. . | |
| 4,967,560 | 11/1990 | Konishi . | |
| 5,136,927 | 8/1992 | Rossigno et al. ...................... | 91/369.2 |
| 5,146,837 | 9/1992 | Inoue . | |
| 5,168,790 | 12/1992 | Konishi . | |
| 5,333,534 | 8/1994 | Uyama . | |
| 5,609,087 | 3/1997 | Horikoshi . | |
| 5,642,652 | 7/1997 | Inoue et al. . | |
| 5,699,713 | 12/1997 | Mortimer ............................... | 91/369.2 |

FOREIGN PATENT DOCUMENTS 8-85442  4/1996  Japan .

OTHER PUBLICATIONS

Hindhede et al, "Coupling of Springs" in Machine Design Fundamentals (John Wiley & Sons, 1983) pp. 203–204.

*Primary Examiner*—F. Daniel Lopez
*Attorney, Agent, or Firm*—Flynn, Thiel, Boutell & Tanis, P.C.

[57] ABSTRACT

According to the invention, a first spring abutment which extends radially outward is formed on a valve plunger, which forms part of a reaction mechanism for brake booster. A second spring abutment which extends radially outward is formed on a plate plunger. A plurality of coiled springs are disposed in parallel across the pair of spring abutments, and a brake reaction is transmitted to the valve plunger through the plate plunger, the second spring abutment, the plurality of the coiled springs and the first spring abutment. With this construction, the plurality of coiled springs which are disposed in parallel provide a combined spring constant, which is given as a sum of spring constants of individual coiled springs, whereby a combined spring constant of an increased magnitude can be obtained. This allows a servo ratio of the brake booster while the plurality of coiled springs are being compressed to be freely chosen as compared with the prior art.

3 Claims, 3 Drawing Sheets

REACTION MECHANISM FOR BRAKE BOOSTER

FIELD OF THE INVENTION

The invention relates to a brake booster, and more particularly, to a reaction mechanism for brake booster which imparts reaction force to a brake pedal which actuates the brake booster.

DESCRIPTION OF THE PRIOR ART

A brake booster is known in the art which comprises a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to thereby switch a flow path in the valve mechanism, an output shaft driven forward as the valve body is driven forward, and a reaction disc interposed between one end of the output shaft and the valve plunger.

In a brake booster of the kind described, a brake reaction which is applied to the output shaft is transmitted to a brake pedal through the reaction disc, the valve plunger and the input shaft. At this time, if a proportion of the reaction which is transmitted to the brake pedal is reduced, the brake booster can be operated with a reduced force of depression, but the maneuverability is degraded in a range where a braking force of a reduced magnitude is required. To accommodate for this, there is proposed a reaction mechanism for brake booster in which the valve plunger comprises a forwardly located plunger member and a rearwardly located valve side member which are disposed to be slidable relative to each other, with a coiled spring disposed between the plunger member and the valve side member (see Japanese Laid-Open Patent Application No. 85,442/96). In a reaction mechanism thus constructed, the plunger member and the valve side member operate integrally through the interposed coiled spring in a range where a braking force of a reduced magnitude is required, and hence a good brake feeling can be achieved by providing a reduced servo ratio for the range. On the other hand, as the brake reaction increases, the reaction can compress the coiled spring, whereby the valve plunger assumes a position corresponding to a further depression which corresponds in amount to the compression. Thus, a servo ratio which is achieved after the initiation of compression of the coiled spring becomes higher, enabling a braking force of an increased magnitude to be obtained with a reduced force of depression.

However, in order to determine a point where the compression of the coiled spring is initiated and the magnitude of a subsequent servo ratio, it is necessary that a preset load to which the coiled spring is charged and a spring constant be chosen to required magnitudes. However, in a conventional reaction mechanism for brake booster, it has been difficult to choose a coiled spring having a required magnitude of spring constant. Specifically, it is difficult for practical purposes to choose a coiled spring having a spring constant of an increased magnitude such that the compression of the coiled spring is continued from the initiation of compression at a given magnitude of an output from the brake booster until the brake booster reaches a full load condition. In the reaction mechanism disclosed in the cited Application, the compression of the coiled spring is terminated before the brake booster reaches its full load condition. When the compression of the coiled spring is terminated and the valve plunger and the reaction disc again operate in an integral manner, the servo ratio resumes an original servo ratio of a reduced magnitude. Thus, subsequently, an increase in a braking output is reduced relative to an increase in the force of depression, thus degrading the brake feeling.

SUMMARY OF THE INVENTION

In view of the foregoing, the invention provides a reaction mechanism for brake booster which permits the spring constant of the coiled spring to be easily chosen to a required magnitude.

Thus, the invention relates to a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, an output shaft driven forward as the valve body is driven forward, and a reaction disc interposed between one end of the output shaft and the valve plunger. In accordance with the invention, a plate plunger is slidably disposed between the valve plunger and the reaction disc. A first spring abutment which extends radially outward is provided on the valve plunger while a second spring abutment which extends radially outward is provided on the plate plunger. A plurality of coiled springs are disposed in parallel between both spring abutments so that the coiled springs can be compressed when a brake reaction in excess of a given value is applied.

By disposing a plurality of coiled springs in parallel between the first spring abutment on the valve plunger and the second spring abutment on the plate plunger, a combined spring constant of the plurality of coiled springs can be made greater than any spring constant of individual coiled springs. Specifically, representing a spring constant of a first coiled spring by $k_1$ and a spring constant of a second coiled spring by $k_2$, the combined spring constant k can be expressed as $k=k_1+k_2$. When a plurality of coiled springs are disposed in parallel in this manner, the combined spring constant is given as a sum of individual spring constants. Accordingly, by suitably choosing spring constants of the individual coiled springs, a combined spring constant of any required magnitude can be easily obtained. As a consequence, the achievement of a spring constant of an increased magnitude which allows the compression of the coiled spring to be continued from the initiation of compression of the coiled spring until the brake booster reaches its full load condition is facilitated.

Above and other objects, features and advantages of the invention will become apparent from the following description with reference to the attached drawings.

DETAILED DESCRIPTION OF THE EMBODIMENTS

Figure 1:
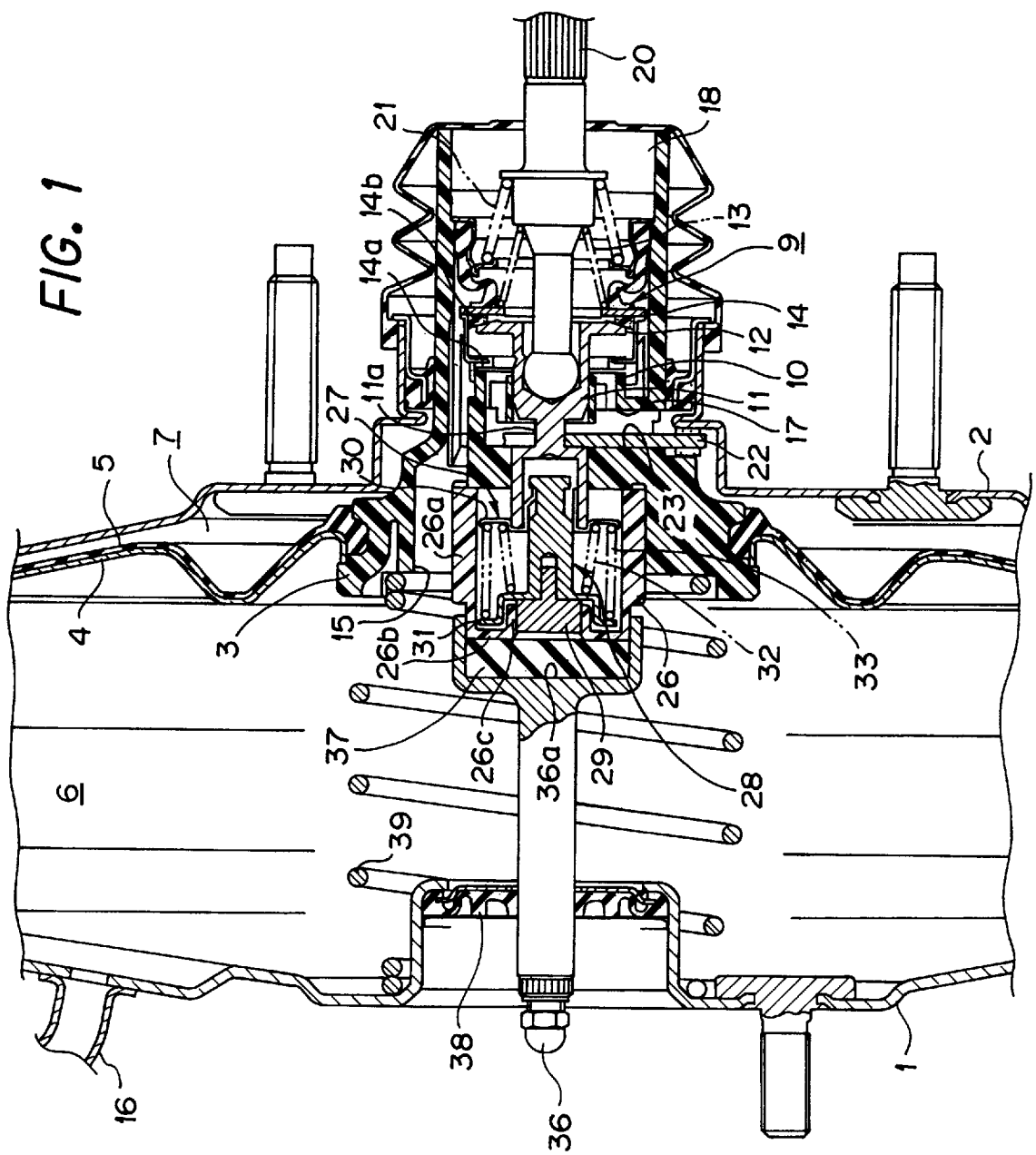
FIG. 1 is a cross section of a first embodiment of the invention.

Referring to the drawings, the invention will now be described with reference to several embodiments shown.

Referring to FIG. 1, a front shell 1 and a rear shell 2 constitute together an enclosed vessel, in which a substantially tubular valve body 3 is slidably disposed. A power piston 4 is mounted around the outer periphery of the valve body 3, and a diaphragm 5 is applied to the rear side of the power piston. The combination of the power piston and the diaphragm partitions the interior of the enclosed vessel into a forwardly located constant pressure chamber 6 and a rearwardly located variable pressure chamber 7.

The valve body 3 contains a valve mechanism 9 which switches a fluid circuit. Specifically, the valve mechanism 9 comprises an annular first valve seat 10 formed around the inner periphery of the valve body 3, an annular second valve seat 12 formed on the right end of a valve plunger 11 which is slidably fitted into the valve body 3, and a valve element 14 which is urged from the right, as viewed in FIG. 1, to be seated upon either valve seat 10 or 12 under the influence of a poppet return spring 13.

The valve element 14 includes a first seat area 14a which is adapted to be seated on the first valve seat 10, and a second seat area 14b which is adapted to be seated on the second valve seat 12. In the embodiment shown, the both seat areas 14a and 14b follow seriatim axially.

A space located radially outward of the first valve seat 10 and the valve element 14 communicates with the constant pressure chamber 6 through a constant pressure passage 15 formed in the valve body 3, and the constant pressure chamber 6 communicates with an intake manifold of an engine through a tubing 16 which is mounted on the front shell 1 for introducing a negative pressure. In this manner, a negative pressure is normally introduced into the chamber 6. A space located radially inward of the first valve seat 10 and the first seat area 14a of the valve element 14 communicate with the variable pressure chamber 7 through a variable pressure passage 17 formed in the valve body 3. A space located radially inward of the second valve seat 12 and the second seat area 14b of the valve element 14 communicates with the atmosphere through a pressure passage 18 formed in the valve body 3.

The right end of the valve plunger 11 is pivotally connected with a distal end of an input shaft 20, and a valve return spring 21 having a greater resilience than the poppet return spring 13 is disposed between the input shaft 20 and the valve body 3, thus normally maintaining the second seat area 14b of the valve element 14 seated upon the second valve seat 12 on the valve plunger 11 and maintaining the first seat area 14a of the valve element 14 away from the first valve seat 10 on the valve body 3. The other end of the input shaft 20 is coupled to a brake pedal, not shown.

The valve plunger 11 is prevented from being disengaged from the valve body 3 by means of a key member 22. While not shown, the key member 22 is forked in a region from its center toward the distal end thereof, and the key member 22 is inserted into a receiving hole 23 which is diametrically formed in the valve body 3, with the end from which the forked portion extends being engaged with a portion 11a of the valve plunger 11 which has a reduced diameter.

The receiving hole 23 and the variable pressure passage 17 are formed adjacent to each other axially of the valve body 3 so as to be integral, but the width of the receiving hole 23, or the width as measured in a direction which is perpendicular to the axial direction of the valve body 3 and which is orthogonal to the direction in which the key member 22 is inserted into the hole 23, is chosen to be greater than the width of the variable pressure passage 17 measured in the same direction, whereby the key member 22 is displaceable axially of the valve body 3 only within the receiving hole 23.

The key member 22 and the valve plunger 11 are displaceable axially of the valve body 3 within an extent of the axial length of the portion 11a having a reduced diameter. By maintaining the key member 22 in abutment against the inner surface of the rear shell 2 when the brake booster is inoperative to thereby maintain the key member 22 and the valve plunger 11 at an advanced position relative to the valve body 3, a lost motion of the input shaft 20 at the commencement of operation of the brake booster can be reduced.

A tubular member 26 is fitted into an opening formed centrally in the front end face of the valve body 3, and includes a portion 26a of an increased diameter which is secured to the valve body 3, a front end 26b which extends radially inward from the front end of the portion 26a, and a portion 26c of a reduced diameter which extends rearwardly from the inner periphery of the front end 26b. The tubular member 26 is effective to prevent a communication between the interior thereof and the constant pressure passage 15.

Slidably fitted into the portion 26c of a reduced diameter of the tubular member 26 is a plunger section 29 of a plate plunger 28, which forms a reaction mechanism 27. A plurality of coiled springs 32, 33 are disposed in parallel and in concentric relationship with each other between a first spring abutment 30 on the valve plunger 11 and a second spring abutment 31 on the plate plunger 28, thus coupling the plate plunger 28 with the valve plunger 11 in ganged relationship.

Figure 2:
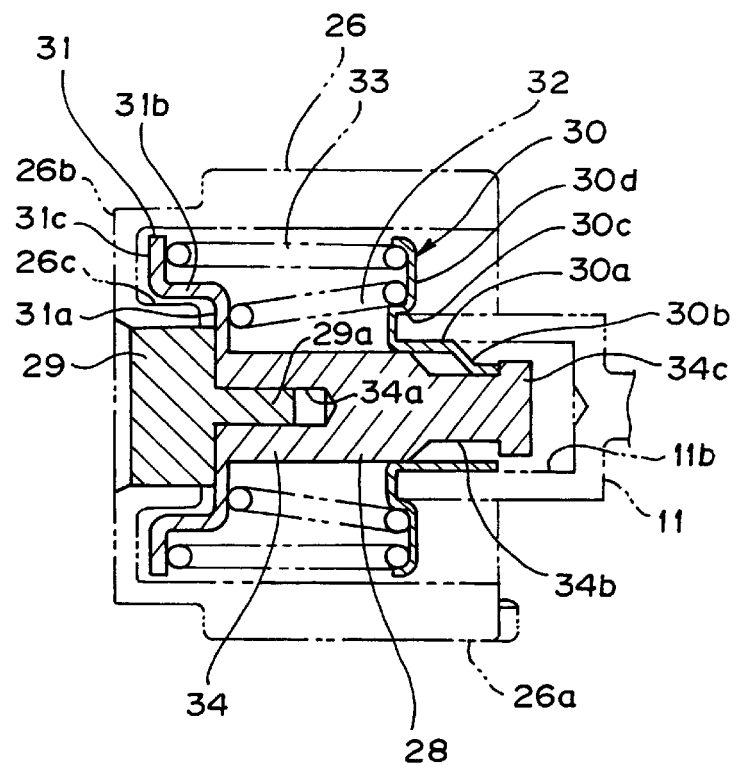
FIG. 2 is an enlarged view showing a pertinent portion shown in FIG. 1.

As shown to an enlarged scale in FIG. 2, in the present embodiment shown, the second spring abutment 31 on the plate plunger 28 is integrally formed with the distal end of an axial portion 34 which extends in the axial direction. A bottomed bore 34a is formed in the front end of the axial portion 34, and a projection 29a which projects rearwardly from the plunger section 29 is fitted into the bore 34a.

The second spring abutment 31 includes a radial portion 31a which extends radially outward from the front end of the axial portion 34, a tubular portion 31b which extends forwardly from the outer periphery of the radial portion 31a, and a radial portion 31c which extends radially outward from the front end of the tubular portion 31b. A clearance is defined between the tubular portion 31b and the plunger section 29 to permit the portion 26c of a reduced diameter of the tubular member 26 to be received therein.

On the other hand, the first spring abutment 30 includes a tubular portion 30a through which the axial portion 34 of the plate plunger 28 slidably extends, a stop 30b which is folded radially inward from the rear end of the tubular portion 30a and which is inserted into an annular groove 34b formed in the outer periphery of the axial portion 34, a fold 30c which is formed by folding from the front end of the tubular portion 30a in the radially outward direction and rearwardly, and a radial portion 30d which continues from the fold 30c to extend radially outward, with its distal end being folded back forwardly.

The inner coiled spring 32 is disposed between the radial portion 30d of the first spring abutment 30 and the inner radial portion 31a of the second spring abutment 31, and the outer coiled spring 33 is disposed between the radial portion 30d of the first spring abutment 30 and the outer radial portion 31c of the second spring abutment 31. The resilience of the both coiled springs 32, 33 maintains the first spring abutment 30 spaced from the second spring abutment 31, and maintains the stop 30b of the second spring abutment 30 resiliently in abutment against a stop 34c which is formed at the rear end of the annular groove 34b formed in the axial portion 34.

Under this condition, the tubular portion 30a of the first spring abutment 30 is fitted into the recess 11b formed in the front end face of the valve plunger 11, and the front end face of the valve plunger 11 is maintained in abutment against the rear end face of the fold 30c of the first spring abutment 30.

To enable the plate plunger 28 to retract relative to the valve plunger 11 while compressing the pair of coiled springs 32, 33, a required clearance is formed between the rear end face of the axial portion 34 and the bottom of the recess 11b in the valve plunger 11. Since the outer radial portion 31c of the second spring abutment 31 is formed to overlap axially the plunger section 29 on the outside thereof, the axial length of the outer coiled spring 33 can be made longer than the inner coiled spring 32, thereby enhancing the freedom in choosing a spring constant and/or a diameter of a wire material used for the coiled spring 33. In other words, the axial length can be reduced by an amount corresponding to the overlap.

A recess 36a is formed in the right end of an output shaft 36, and a reaction disc 37 is fitted into the recess 36a. The portion 26a of the tubular member 26 which has an increased diameter is slidably fitted into the recess 36a to cause the rear end face of the reaction disc 37 to abut against the front end 26b of the tubular member 26, thus allowing the plunger section 29 of the plate plunger 28 to be disposed in opposing relationship with the reaction disc 37 with a given clearance therebetween.

The left end of the output shaft 36 projects externally of the front shell 1 with a hermetic seal maintained by means of a seal member 38, the distal end thereof being connected to a piston of a master cylinder, not shown, which is mounted on the front shell 1.

The valve body 3 and the power piston 4 are normally maintained in their inoperative positions shown by a return spring 39.

With the described construction, when a brake pedal is depressed to drive the input shaft 20 and the valve plunger 11 forward, the reaction mechanism 27 is driven forward by the valve plunger 11 while remaining in its inoperative condition until the force of depression exceeds the preset loads to which the pair of coiled springs 32, 33 in the reaction mechanism 27 are charged.

As the valve plunger 11 is driven forward, a flow path in the valve mechanism 9 is switched to introduce the atmosphere into the variable pressure chamber 7, in the similar manner as in a conventional brake booster, and accordingly, a pressure differential between the constant pressure chamber 6 and the variable pressure chamber 7 drives the power piston 4 and the valve body 3, and hence the output shaft 36, thus generating a braking liquid pressure in the master cylinder.

A brake reaction which results from the braking liquid pressure is transmitted to a brake pedal through the output shaft 36, the reaction disc 37, the plunger section 29 of the plate plunger 28, the second spring abutment 31 on the plate plunger 28, the pair of coiled springs 32, 33, the first spring abutment 30 on the valve plunger 11, the valve plunger 11 and the input shaft 20. A relationship which is established between an output from the brake booster and the force of depression (input) applied to the brake pedal is graphically shown by a straight line A shown in FIG. 3.

As the force of depression applied to the brake pedal increases to increase the output from the brake booster, the brake reaction which is applied to the reaction mechanism 27 also increases. When the reaction exceeds the preset loads to which the pair of coiled springs 32, 33 are charged, these coils begin to be compressed (see point B in FIG. 3). The point B can be freely chosen by changing the preset loads to which the coiled springs 32, 33 are charged.

Figure 3:
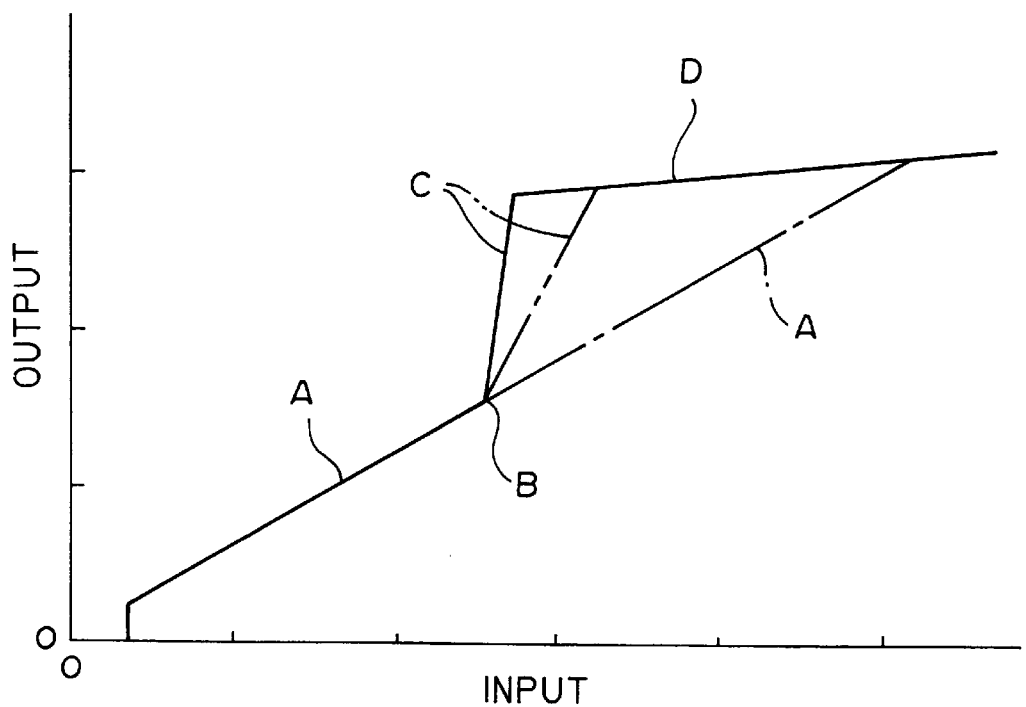
FIG. 3 graphically shows the characteristic diagram of the embodiment.

When the coiled springs 32, 33 are compressed, the valve plunger 11 assumes an advanced position relative to the valve body 4, whereby the output from the brake booster increases with a servo ratio which is greater than the servo ratio indicated by the inclination of the straight line A (see straight line C shown in FIG. 3). The inclination of the straight line C (or servo ratio) can be freely chosen by changing the combined spring constant k of the pair of coiled springs 32, 33. As mentioned previously, the combined spring constant k is given as $k=k_1+k_2$ where $k_1$ and $k_2$ represent individual spring constants of the respective springs. The combined spring constant k of the coiled springs 32, 33 is chosen so that the brake booster reaches its full load condition (indicated by straight line D) in the course of the coiled springs 32, 33 being compressed. In other words, the brake booster is designed to reach its full load condition before the axial portion 34 of the plate plunger 28 abuts against the valve plunger 11 to make them functioning integrally.

Second Embodiment

Figure 4:
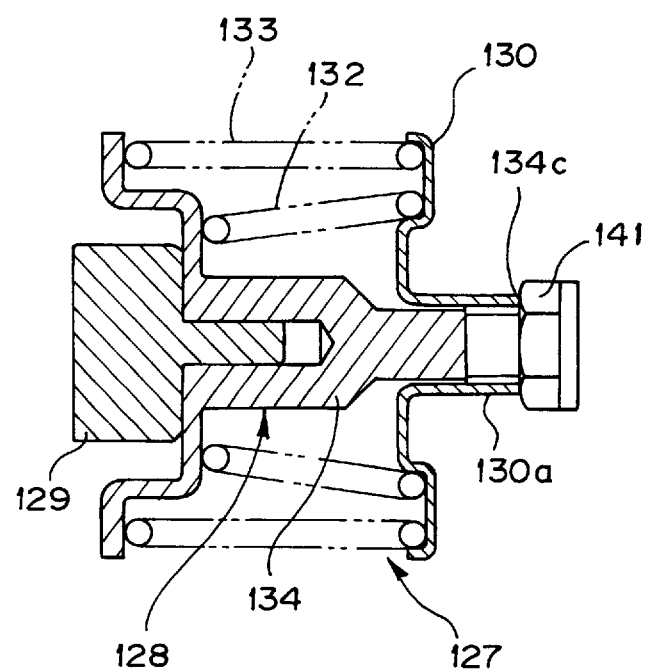
FIG. 4 is a cross section, showing an essential portion of a second embodiment of the invention.

FIG. 4 shows a second embodiment of the invention. In this embodiment, a plate plunger 128, which forms a reaction mechanism 127, includes an axial portion 134 having a rear end which is formed to be of a reduced diameter, which in turn slidably extends through a tubular portion 130a of a first spring abutment 130. A nut 141 is threadably engaged with the rear end of the axial portion 134, and the front end face of the nut 141 serves as a stop 134c for the tubular portion 130a. In other respects, the arrangement is similar to that described above in connection with the first embodiment. A pair of coiled springs 132, 133 are disposed between the first spring abutment 130 and a second spring abutment 131.

A reaction mechanism 27 or 127 is constructed as a single assembly in the described embodiments, and accordingly it appears that the first spring abutment 30 is provided on the part of the plate plunger 28 or 128. However, the first spring abutment 30 is adapted to abut against the front end face of the valve plunger 11 to operate integrally therewith, and thus is actually mounted on the valve plunger 11. Accordingly, the first spring abutment 30 may be formed integrally with the valve plunger 11.

While the invention has been described above in connection with several embodiments thereof, it should be understood that a number of changes, modifications and substitutions therein are possible by one skilled in the art from the above disclosure without departing from the scope and the spirit of the invention defined by the appended claims.

What is claimed is:

1. In a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, an output shaft driven forward as the valve body is driven forward, and a reaction disc interposed between one end of the output shaft and the valve plunger;

a reaction mechanism for said brake booster comprising a plate plunger which is slidably disposed between the valve plunger and the reaction disc, a first spring abutment which extends radially outward being formed on the valve plunger, a second spring abutment which extends radially outward being provided on the plate plunger, and a plurality of coiled springs being disposed in parallel between the first and second spring abutments, the coiled springs being compressed when a brake reaction in excess of a given value is applied;

a tubular member fitted into the valve body, the tubular member including a portion of an increased diameter which is secured to the valve body, a front end portion which extends radially inward from a front end of the portion of an increased diameter, and a portion of a reduced diameter which extend rearward from an inner periphery of the front end portion, the output shaft being formed with a recess at its one end which receives the reaction disc, the portion of an increased diameter of the tubular member being slidably fitted into the recess to cause the reaction disc to abut against the front end portion of the tubular member, the plate plunger including a plunger section at its front end which is slidably fitted into the portion of a reduced diameter, the second spring abutment including a radial portion which extends radially outward, a tubular portion which extends forwardly from the outer periphery of the radial portion, and another radial portion which extends radially outward from a front end of the tubular portion, the plurality of coiled springs being disposed in a concentric manner, at least an outer one of the coiled springs resiliently abutting against the outer radial portion of the second spring abutment, the portion of a reduced diameter of the tubular member extending into a clearance formed between the tubular portion of the second spring abutment and the plunger section.

2. A reaction mechanism for brake booster according to claim 1 in which the plurality of coiled springs provide a combined spring constant which is chosen so that the brake booster reaches its full load condition in the course of these coiled springs being compressed.

3. In a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, an output shaft driven forward as the valve body is driven forward, and a reaction disc interposed between one end of the output shaft and the valve plunger;

a reaction mechanism for said brake booster comprising a plate plunger which is slidably disposed between the valve plunger and the reaction disc, a first spring abutment which extends radially outward being formed on the valve plunger, a second spring abutment which extends radially outward being provided on the plate plunger, and a plurality of coiled springs being disposed in parallel between the first and second spring abutments, the coiled springs being compressed when a brake reaction in excess of a given value is applied, the first spring abutment including a tubular portion through which an axial portion extending from a rear end of the plate plunger slidably extends, a fold which is formed by folding the front end of the tubular portion radially outward and rearwardly, and a radial portion which continues from and extends radially outward from the fold, the coiled springs resiliently abutting against the radial portion of the first spring abutment to cause the first spring abutment to abut resiliently against a stop which is formed rearwardly of the axial portion of the plate plunger, the tubular portion of the first spring abutment being fitted into a recess formed in a front end face of the valve plunger while the front end face of the valve plunger abuts against the rear end face of the fold.

* * * * *